United States Patent
Elgarat et al.

(10) Patent No.: US 10,162,849 B1
(45) Date of Patent: Dec. 25, 2018

(54) SYSTEM, METHOD, AND COMPUTER PROGRAM FOR AUTOMATIC DATABASE VALIDATION ASSOCIATED WITH A SOFTWARE TEST

(71) Applicant: Amdocs Software Systems Limited, Dublin (IE)

(72) Inventors: Sharon Elgarat, Kibbutz Mefalsim (IL); Yuval Alon, Kfar-Saba (IL); Assaf Ben David, Oranit (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 575 days.

(21) Appl. No.: 14/923,367

(22) Filed: Oct. 26, 2015

(51) Int. Cl.
G06F 17/30 (2006.01)
G06F 11/36 (2006.01)

(52) U.S. Cl.
CPC .... *G06F 17/30371* (2013.01); *G06F 11/3668* (2013.01); *G06F 17/30088* (2013.01)

(58) Field of Classification Search
CPC ........... G06F 11/3668; G06F 17/30371; G06F 17/30088
See application file for complete search history.

(56) References Cited

U.S. PATENT DOCUMENTS 6,745,344 B1 6/2004 Joshi et al.
7,257,705 B2 8/2007 Flam et al.
(Continued)

FOREIGN PATENT DOCUMENTS

WO WO-2005048138 A2 * 5/2005 .......... G06F 11/3688

*Primary Examiner* — Albert M Phillips, III

(74) *Attorney, Agent, or Firm* — Zilka-Kotab, P.C.

(57) ABSTRACT

A system, method, and computer program product are provided for automatic database validation associated with a software test. In use, an indication that a user is beginning a software test that utilizes one or more databases is received. A first configuration snapshot of the one or more databases is recorded in response to receiving the indication that the user is beginning the software test, prior to the user beginning the software test. Additionally, an indication that the user has finished the software test is received. A second configuration snapshot of the one or more databases is recorded in response to receiving the indication that the user has finished the software test. The first configuration snapshot of the one or more databases is automatically compared to the second configuration snapshot of the one or more databases. Further, changes that occurred in the one or more databases resulting from the software test are automatically identified, based on the comparing of the first configuration snapshot of the one or more databases to the second configuration snapshot of the one or more databases. The changes that occurred in the one or more databases resulting from the software test are displayed utilizing at least one user interface. Still yet, the changes that occurred in the one or more databases resulting from the software test are automatically compared to past changes that occurred in the one or more databases resulting from a past software test. A difference in the changes that occurred in the one or more databases resulting from the software test and the past changes that occurred in the one or more databases resulting from the past software test is automatically identified, based on comparing the changes that occurred in the one or more databases resulting from the software test and the past changes that occurred in the one or more databases resulting from the past software test. Moreover, an indication of the difference in the changes that occurred in the one or more databases resulting from the software test and the past changes that occurred in the one or more databases resulting from the past software test is displayed utilizing the at least one user interface.

18 Claims, 5 Drawing Sheets

(56) References Cited

U.S. PATENT DOCUMENTS

| | | |
|---|---|---|
| 8,347,267 B2 | 1/2013 | Givoni et al. |
| 2005/0044533 A1* | 2/2005 | Nesbit ................. G06F 11/3688 717/124 |
| 2007/0046282 A1 | 3/2007 | Childress et al. |
| 2015/0347282 A1* | 12/2015 | Wingfors ............ G06F 11/3688 717/125 |

* cited by examiner

Data Spy -- a database validation self learning system

Test Executed: Create Customer

Table level Data Validity Gaps from previous runs

| Table Name | Lines Added | | Lines Modified | | Remove |
|---|---|---|---|---|---|
| | Expected | Actual | Expected | Actual | |
| TB_BILLING_ARRANGEMENT | 2 | 2 | 1 | 0 | ○ |
| TB_PROFILE_ATR | 0 | 1 | 0 | 0 | ○ |
| TB_CUSTOMER_PARAMS | 1 | 2 | 5 | 4 | ○ |

Field level Data Validity Gaps from previous runs

| Table Name | Field Name | Field Populated | | Field Modified | | Remove |
|---|---|---|---|---|---|---|
| | | Expected | Actual | Expected | Actual | |
| TB_CUSTOMER | CYCLE_CODE | Yes | No | No | No | ○ |
| TB_ENTITY_ATR_CODE | CUST_CODE | No | No | No | Yes | ○ |

Business level Gaps from previous runs

| Table Name | Field Name | Business Value | | Remove |
|---|---|---|---|---|
| | | Expected | Actual | |
| TB_CUSTOMER | PROFILE_CODE | T32 | T49 | ○ |
| TB_CUST_INSTANCE | TYPE | SP | IND | ○ |

SYSTEM, METHOD, AND COMPUTER PROGRAM FOR AUTOMATIC DATABASE VALIDATION ASSOCIATED WITH A SOFTWARE TEST

FIELD OF THE INVENTION

The present invention relates to software testing, and more particularly to database validation in the context of software testing.

BACKGROUND

During the lifecycle of a software project, software tests are performed many times. During those tests, there are multiple levels of validation expected for each test. One of the most common validation levels is data integrity within a database associated with the software test.

In large and complex systems, every action performed by a user effects a wide variety of tables within the database. Defects repeatedly escape from professional testers into the live production system, thus showing that even focused professional testers working with highly configured tools or common market database tools face difficulties in identifying all potential errors.

Tools available today either force the user to define table names and fields that should be validated for each activity or only allow the user to see a current state of a test, thus limiting the tool's ability to alert the user about unexpected behavior associated with the test. The complex configuration effort required to implement most testing tools discourages many testing organizations from adopting the tools, leaving the organizations with only basic manual checks the testers may or may not perform.

There is thus a need for addressing these and/or other issues associated with the prior art.

SUMMARY

A system, method, and computer program product are provided for automatic database validation associated with a software test. In use, an indication that a user is beginning a software test that utilizes one or more databases is received. A first configuration snapshot of the one or more databases is recorded in response to receiving the indication that the user is beginning the software test, prior to the user beginning the software test. Additionally, an indication that the user has finished the software test is received. A second configuration snapshot of the one or more databases is recorded in response to receiving the indication that the user has finished the software test. The first configuration snapshot of the one or more databases is automatically compared to the second configuration snapshot of the one or more databases. Further, changes that occurred in the one or more databases resulting from the software test are automatically identified, based on the comparing of the first configuration snapshot of the one or more databases to the second configuration snapshot of the one or more databases. The changes that occurred in the one or more databases resulting from the software test are displayed utilizing at least one user interface. Still yet, the changes that occurred in the one or more databases resulting from the software test are automatically compared to past changes that occurred in the one or more databases resulting from a past software test. A difference in the changes that occurred in the one or more databases resulting from the software test and the past changes that occurred in the one or more databases resulting from the past software test is automatically identified, based on comparing the changes that occurred in the one or more databases resulting from the software test and the past changes that occurred in the one or more databases resulting from the past software test. Moreover, an indication of the difference in the changes that occurred in the one or more databases resulting from the software test and the past changes that occurred in the one or more databases resulting from the past software test is displayed utilizing the at least one user interface.

BRIEF DESCRIPTION OF THE DRAWINGS

FIG. 3 illustrates a user interface showing output validations and changes that occurred in a database resulting from a software test, in accordance with one embodiment.

DETAILED DESCRIPTION

Figure 1:
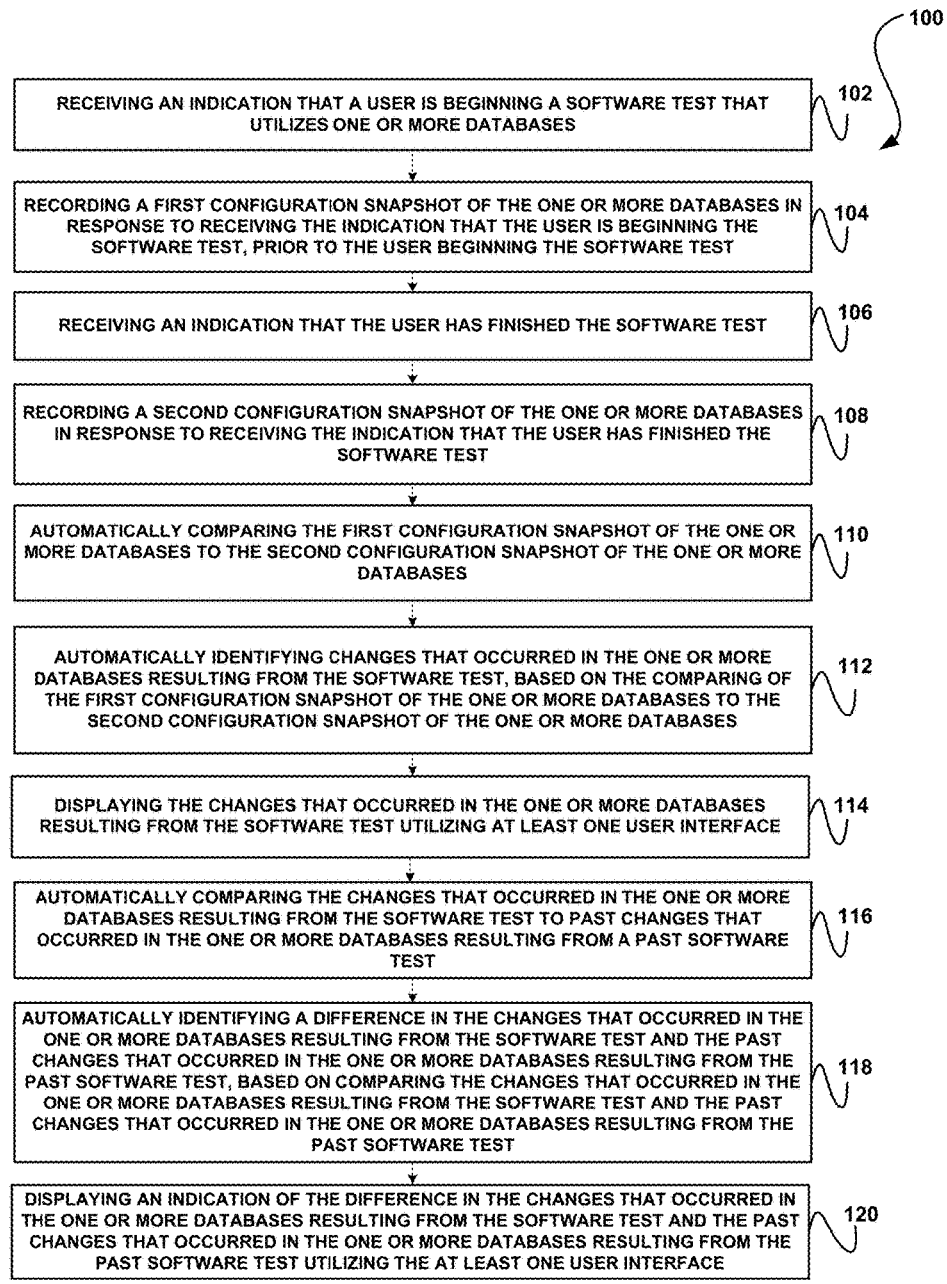
FIG. 1 illustrates a method for automatic database validation associated with a software test, in accordance with one embodiment.

FIG. 1 illustrates a method 100 for automatic database validation associated with a software test, in accordance with one embodiment.

As shown, an indication that a user is beginning a software test that utilizes one or more databases is received. See operation 102. The software test may include any software test associated with various computer code, software tools, applications, and/or any other type of software. The software test may be associated with various industries, such as the telecommunication industry, etc.

The indication that the user is beginning the software test may include any type of indication from a user or an indication determined automatically based on user action. For example, the indication that the user is beginning the software test may include an indication received by the user utilizing at least one user interface prior to the user beginning the software test. This may include, for example, the user selecting a 'begin', 'start', or 'record' button on the user interface.

In response to receiving the indication that the user is beginning the software test, a first configuration snapshot of the one or more databases is recorded, prior to the user beginning the software test. See operation 104. Recording the configuration snapshot may include logging a current state of configuration of the databases, as well as logging any and all information stored in the databases. The first configuration snapshot may be stored for at least a duration of the software test.

Additionally, an indication that the user has finished the software test is received. See operation 106. The indication that the user has finished the software test may include any type of indication from a user or an indication determined automatically based on user action. For example, the indication that the user has finished the software test may include an indication received by the user utilizing at least one user interface after the user has finished the software test. This may include, for example, the user selecting a 'finished', 'end', or 'stop' button on the user interface.

A second configuration snapshot of the one or more databases is recorded in response to receiving the indication that the user has finished the software test. See operation 108. Once again, recording the second configuration snapshot may include logging a current state of configuration of the databases at the end of the test, as well as logging any and all information stored in the databases.

The first configuration snapshot of the one or more databases is automatically compared to the second configuration snapshot of the one or more databases. See operation 110.

Further, changes that occurred in the one or more databases resulting from the software test are automatically identified, based on the comparing of the first configuration snapshot of the one or more databases to the second configuration snapshot of the one or more databases. See operation 112.

Further, the changes that occurred in the one or more databases resulting from the software test are displayed utilizing at least one user interface. See operation 114. This may include, for example, displaying a number of changes that were identified (e.g. based on a category of a change, etc.) and/or displaying information associated with the change (e.g. a name of a field changed, etc.).

The changes may include any changes that occurred in the databases during the software test.

For example, identifying the changes may include identifying table level changes that occurred in the databases during the software test. In this case, displaying the changes that occurred in the databases may include displaying a number of new lines added to one or more tables stored in the databases during the software test. Additionally, displaying the changes that occurred in the databases may include displaying a number of lines modified in one or more tables stored in the databases during the software test.

As another example, automatically identifying the changes that occurred in the databases resulting from the software test may include identifying field level changes that occurred in the databases during the software test. In this case, displaying the changes that occurred in the databases may include displaying an indication of whether fields stored in the databases that were empty, were populated during the software test. Additionally, displaying the changes that occurred in the databases may include displaying an indication of whether fields stored in the databases were modified during the software test.

As another example, automatically identifying the changes that occurred in the databases resulting from the software test may include identifying value level changes that occurred in the databases during the software test. In this case, displaying the changes that occurred in the databases may include displaying values that were logged during the software test.

Still yet, the changes that occurred in the one or more databases resulting from the software test are automatically compared to past changes that occurred in the one or more databases resulting from a past software test. See operation 116. The past changes that occurred in the databases resulting from the past software test may be stored in a repository including changes that occurred in a plurality of tests that have occurred prior to the current software test. For example, operations 102 through 112 may have been performed previously during the course of a similar software test and the changes detected may have been stored in the repository.

Moreover, the changes that occur in the one or more databases resulting from the current software test may be logged for future software tests. The information may be stored at different levels, for example, table level changes, field level changes or value level changes. Future tests may use the information to reflect commonalties and differences between similar tests. Reflecting similarities and differences of different types, for example, functional or business similarities/differences.

A difference in the changes that occurred in the one or more databases resulting from the software test and the past changes that occurred in the one or more databases resulting from the past software test is automatically identified, based on comparing the changes that occurred in the one or more databases resulting from the software test and the past changes that occurred in the one or more databases resulting from the past software test. See operation 118.

The difference may be referred to as 'gaps' between the current test and a previous test. Any gaps may be identified. For example, gaps (i.e. differences) may be identified when a previous test run shows a change and a current test run shows a change but they are not the same change. As another example, gaps (i.e. differences) may be identified when a previous test run shows a change and a current test run shows no change. As another example, gaps (i.e. differences) may be identified when a previous test run shows no change and a current test run does show a change.

Identifying the difference in the changes that occurred in the databases resulting from the software test and the past changes that occurred in the databases resulting from the past software test functions to validate the databases as at least part of validating the software test.

Moreover, an indication of the difference in the changes that occurred in the one or more databases resulting from the software test and the past changes that occurred in the one or more databases resulting from the past software test is displayed utilizing the at least one user interface. See operation 120.

The indication of the difference in the changes may be presented in a variety of ways. For example, the indication of the difference in the changes that occurred in the databases resulting from the software test and the past changes that occurred in the databases resulting from the past software test may include presenting expected changes based on the past changes that occurred in the databases resulting from the past software test and presenting actual changes that occurred in the current software test (e.g. with differences highlighted, etc.).

The user interface displays the changes and gaps in one or more organized graphic user interface screens for the user to evaluate the changes and gaps. Additionally, the user interface may present the user with an option to indicate whether the software test passed or failed based on the changes and gaps, etc. In this case, if the user indicates that the software test failed, the user interface may prompt the user for an indication of a specific failure, to incite saving information associated with the specific failure. Further the at least one user interface may display controllers (e.g. selection boxes, etc.) that allow the user to select specific information (e.g. changes, gaps, etc.) to ignore testing in future software tests. Such controllers may teach the system how to present more accurate results with each test performed, focusing on relevant changes without requiring pre-configuration.

It should be noted that two or more of the operations of the method 100 may be combined, in various embodiments (e.g. the displaying of operations 114 and 120, etc.). It should also be noted that the method 100 may be implemented utilizing various hardware, software, applications, user interfaces, etc., as dictated by the implementer.

Thus, the method 100 may be implemented by a system and/or tool for performing database validations at multiple levels, without depending on pre-validation user configuration activities. A system implementing the method 100 provides testers valuable information from a first run of a test, although zero configurations were made. The system may utilize snapshots taken when an indication the tester is ready is received, and a comparison may be performed when the tester has finished.

This allows for minimization of the irrelevant (e.g. garbage) information received by the tester. The system implementing the method 100 also has the ability to learn from test run to test run, and to automatically include more validated values, thus saving the tester time. The system implementing the method 100 may implement an intuitive tool (e.g. a user interface, etc.) for use by testers with no knowledge of the database structure or in complex SQL writing.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Users working on a software application testing are exposed to only a fraction of the information saved by systems while their testing action is performed. A vast array of software error types can cause corruption of data. Such corruption will, in most cases, be hidden from the user who works on the system's user interface and can manifest far after the testing action is complete. For example, error manifestations may occur at a time when no amount of investigation can help identify the original action that contributed to the invalid data.

Various validation tools were created to allow professional testers to identify such issues and ensure they are fixed before the system is open to use for real users. Those validation tools require different levels of knowledge in SQL writing, etc. In addition, all existing tools require the user to provide a large range of configuration data, including table names, field names, and even values expected to be validated. The need to spend a large amount of time and the need to have an in-depth database structure knowledge limits the ability of testers to use such tools and limits the value the tester can get from the tool, as the validations focus only on the areas the testers configured.

Figure 2:
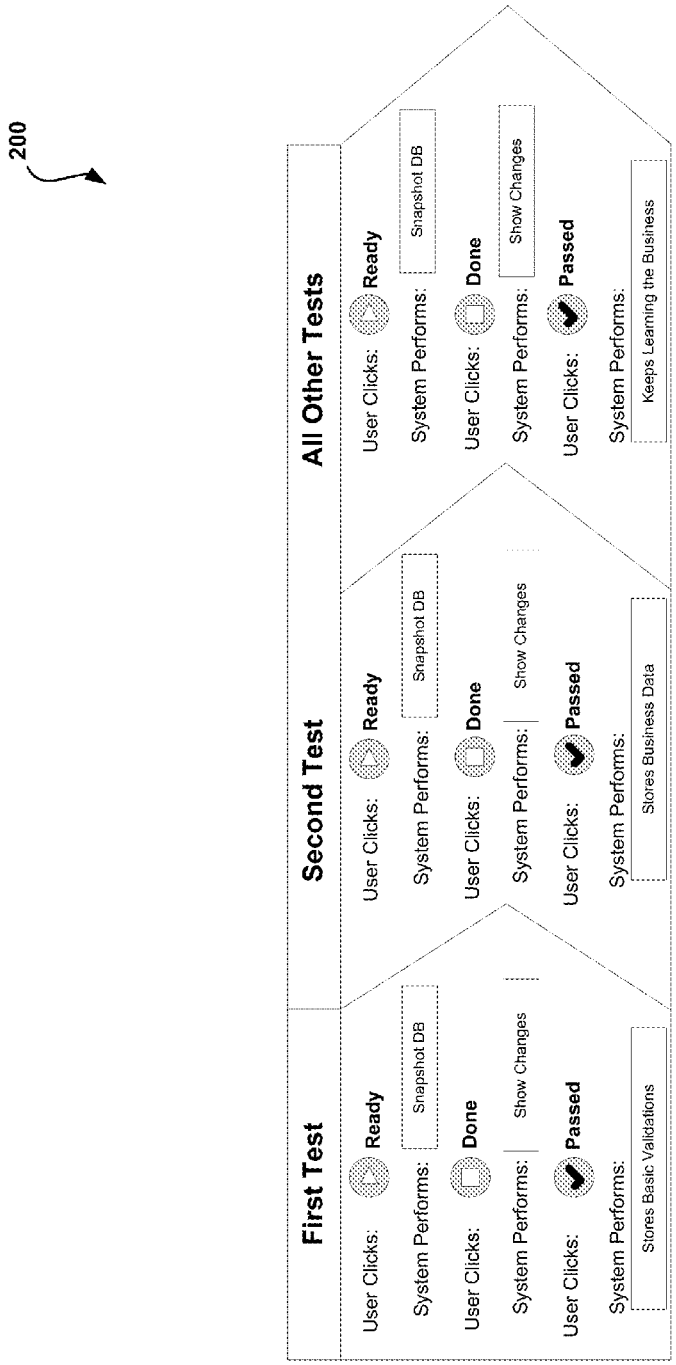
FIG. 2 illustrates a system work flow for automatic database validation associated with a software test, in accordance with one embodiment.

FIG. 2 illustrates a system work flow 200 for automatic database validation associated with a software test, in accordance with one embodiment. As an option, the work flow 200 may be implemented in the context of the details of FIG. 1. Of course, however, the work flow 200 may be implemented in the context of any desired environment. Further, the aforementioned definitions may equally apply to the description below.

In operation, a system implementing the workflow 200 will wait for a user to indicate the user is ready to perform a test. This may include, for example, the user pressing or selecting a 'ready' or 'start' button on a user interface (e.g. a graphical user interface). The system may then prompt the user (e.g. utilizing a user interface) to either select an existing test type or to enter a name for a new test type.

The system will then take a snapshot of the database for which connection details were given. In this case, the connection details may be known from the selected test or the user may select/enter the connection details (e.g. connect to which database, etc.). The snapshot is kept at least until the end of the test. The snapshot will include the configuration details of the database, including current data and structures stored therein.

The system waits until the user indicates the test has completed. This may include, for example, the user selecting or pressing a 'done' or 'complete' button utilizing a user interface. At this point, the system compares the current snapshot of the database with the previous snapshot taken.

FIG. 3 illustrates a user interface 300 showing output validations and changes that occurred in a database resulting from a software test, in accordance with one embodiment. As an option, the user interface 300 may be implemented in the context of the details of the previous figures. Of course, however, the user interface 300 may be implemented in the context of any desired environment. Further, the aforementioned definitions may equally apply to the description below.

The system may report any change in the database(s) occurring as a result of the test, as determined by comparing the current snapshot of the database(s) with the previous snapshot taken (e.g. utilizing a user interface).

For example, in one embodiment, the system may report back table level changes, field level changes, and/or value level changes. For table level changes, the system may present (e.g. utilizing one or more user interfaces, etc.) the number of new lines added and/or the number of lines modified in tables stored in the database.

For field level changes, the system may present (e.g. utilizing one or more user interfaces, etc.) an indication of whether fields stored in the database that were empty became populated, and/or whether any fields were modified.

For value level changes, the system may present (e.g. utilizing one or more user interfaces, etc.) the values that were logged inside changes.

The user receives the information in an organized graphic user interface screen, as shown in FIG. 3, in accordance with one embodiment. Thus, the user may utilize the graphic user interface screen to evaluate the results.

Within the user interface 300, which presents the changes, there are controllers that allow the user to select specific changes the user would like the system to ignore going forward (e.g. for a particular test type, etc.).

At the end of the user's review of the changes, the user may utilize a user interface to indicate whether the test was successful or whether the test failed. Test information may be saved in both cases of passed tests and failed tests. However, in the case the test failed, the system may prompt the user (e.g. utilizing a user interface) to indicate the failure (e.g. the failed line, etc.) so the system can avoid saving that specific information.

The system may save a variety of data associated with the test. For example, the system may save the table level changes and field level changes. The system may also save the counts of records. The system may also save the actual values that will be required for later use in the business level validations.

Items that the user indicated should be ignored (e.g. utilizing the user interface 300, etc.) are also logged to make sure those elements will not be compared on subsequent test runs. The information may be saved per test type.

As noted, once the user indicates that the test has completed, the system compares the current snapshot of the database with the previous snapshot taken. After all the changes are collected, the system compares the changes in the current test run with the changes in the saved previous test run.

Matches where the previous test run and the current test run show the same count are not exposed to the user. Thus, only gaps (i.e. differences) are exposed to the user, for example, in a table showing the previous run as the expected result and the current run as actual result (e.g. as shown in FIG. 3).

In one embodiment, any invalid value may be highlighted (e.g. in a color such as red, bold, etc.).

The system may present all gap types. For example, gaps (i.e. differences) may be presented when a previous test run shows a change and a current test run shows a change but they are not the same change. As another example, gaps (i.e. differences) may be presented when a previous test run shows a change and a current test run shows no change. As another example, gaps (i.e. differences) may be presented when a previous test run shows no change and a current test run does show a change.

In one embodiment, the system may present the gap impacts on both table and field data integrity levels. The system may show the information utilizing a clear graphic user interface screen (e.g. as shown in FIG. 3). Within the user interface that presents the gaps, there may be controllers that allow the user to select specific gaps (i.e. differences) the user would like the system to ignore going forward (e.g. for a particular test type).

At the end of the user's review of all gaps, the user may indicate whether the test was successful or whether the test failed, based on the gaps (i.e. based on the differences in the changes noted in the current test versus changes noted in the previous or past test).

The system may save (e.g. in a table, etc.) gaps that the user indicated should be ignored as items that should not be compared in the future tests (e.g. as with changes, etc.).

Thereafter, the system may retrieve all changes that did not have gaps and compare values between previous test runs and a current test run. Values that do not match may be removed from an internal database, such that only matching values are kept. This allows the system to refine a knowledge of user actions such that subsequent test runs of the same activity display the correct expected behavior. At the end of this process, the values stored are considered as information for business validation, meaning for this type of test this specific information is expected to appear.

For business information, the system behaves the same way as explained in the context of handling gaps (i.e. differences), with the addition of validating and presenting business information gaps.

The business information gaps are calculated by comparing matching values and information kept in previous test runs with the same field in the same table as a current test run. All three levels of validation described may be presented within the graphic user interface screen.

Additionally, the user is able to select business information gaps the user would like the system to ignore. If such gaps are selected from the business area, the system will remove the value kept in the database such that this value will no longer be considered as a value that must always appear with the same value for this type of test.

This helps over time to refine the system to cover all business cases, as each business case can be defined as a test type and values can be refined for that business case.

Thus, the system links information to a user activity such that the system can learn over time, during the project's lifecycle, from one test to the other and show similarities between repetitions of the same user activity/test case executed.

The system requires no configuration effort and can contribute value from the moment the user starts using the system. The system also covers an entire database, without assuming any area is safe or unused. Initial tests might show some irrelevant information but the more the system is used, the more the system learns the business and will return accurate issues.

The system does not require the user to have either in-depth knowledge of the system or time to spare on configuration, or development skills for automation scripts writing.

The system may be implemented utilizing various hardware (e.g. processors, memory, databases, etc.) and software (e.g. software applications, user interfaces, computer code, etc.)

Figure 4:
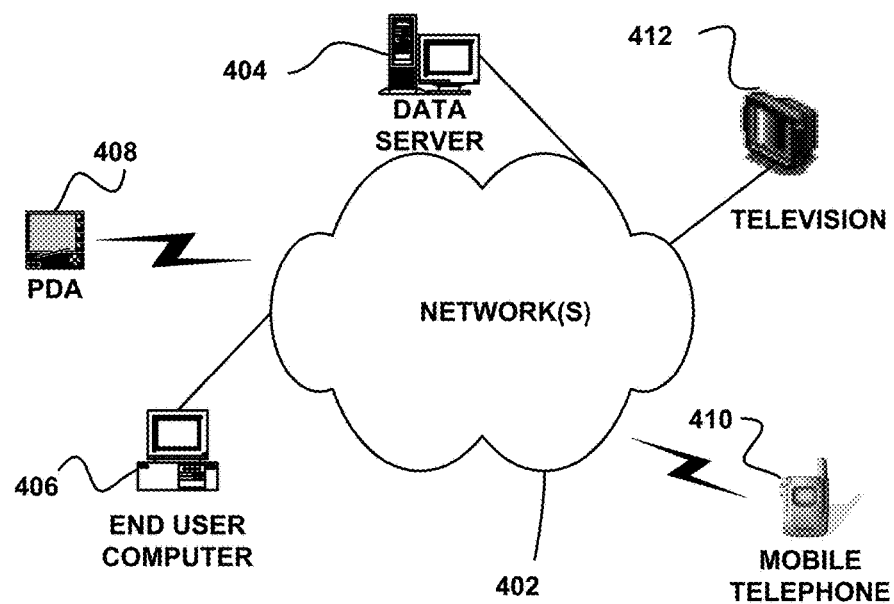
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
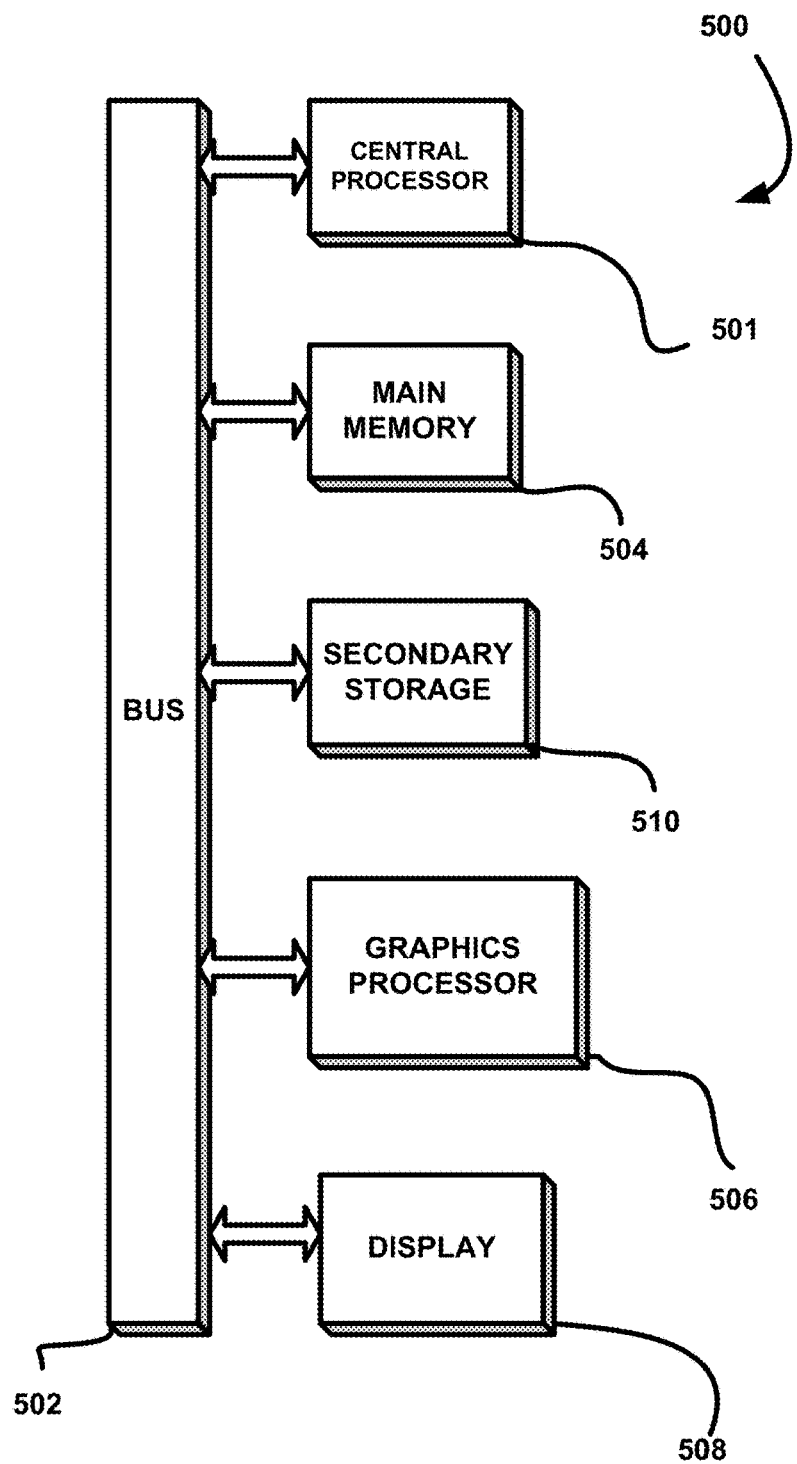
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    receiving an indication that a user has requested execution of a software test that utilizes one or more databases;
    in response to receiving the indication that the user has requested execution of the software test and prior to the execution of the software test, recording a first configuration snapshot of the one or more databases, the first configuration snapshot including:
        an initial state of a configuration of the one or more databases including initial structures stored in the one or more databases and initial names of tables and fields included in the one or more databases, and initial information stored in the one or more databases;
    receiving an indication that the execution of the software test has finished;
    recording a second configuration snapshot of the one or more databases in response to receiving the indication that the execution of the software test has finished, the second configuration snapshot including:
        an end state of a configuration of the one or more databases including end structures stored in the one or more databases and end names of the tables and the fields included in the one or more databases, and end information stored in the one or more databases;
    automatically comparing the first configuration snapshot of the one or more databases to the second configuration snapshot of the one or more databases to identify differences between the first configuration snapshot and the second configuration snapshot;
    automatically identifying changes that occurred in the one or more databases as a result of the execution of the software test, based on the differences identified from comparing of the first configuration snapshot of the one or more databases to the second configuration snapshot of the one or more databases;
    displaying the changes that occurred in the one or more databases as a result of the execution of the software test utilizing at least one user interface;
    automatically comparing the changes that occurred in the one or more databases as a result of the execution of the software test to past changes that occurred in the one or more databases as a result of a prior execution of the software test;
    automatically identifying a difference in the changes that occurred in the one or more databases as a result of the execution of the software test and the past changes that occurred in the one or more databases as a result of a prior execution of the software test, based on comparing the changes that occurred in the one or more databases as a result of the execution of the software test and the past changes that occurred in the one or more databases as a result of a prior execution of the software test; and
    displaying an indication of the difference in the changes that occurred in the one or more databases as a result of the execution of the software test and the past changes that occurred in the one or more databases as a result of a prior execution of the software test, utilizing the at least one user interface.

2. The non-transitory computer readable medium of claim 1, wherein the changes that occurred in the one or more databases as a result of the execution of the software test include changes to one of the tables in the one or more databases.

3. The non-transitory computer readable medium of claim 2, wherein displaying the changes that occurred in the one or more databases includes displaying a number of new lines added to the table in the one or more databases.

4. The non-transitory computer readable medium duct of claim 2, wherein displaying the changes that occurred in the one or more databases includes displaying a number of lines modified in the table in the one or more databases.

5. The non-transitory computer readable medium of claim 1, wherein the changes that occurred in the one or more databases as a result of the execution of the software test include changes to one of the fields in the one or more databases.

6. The non-transitory computer readable medium of claim 5, wherein displaying the changes that occurred in the one or more databases includes displaying an indication that the field in the one or more databases that were empty, was populated during the software test.

7. The non-transitory computer readable medium of claim 5, wherein displaying the changes that occurred in the one or more databases includes displaying an indication that the field in the one or more databases was modified during the software test.

8. The non-transitory computer readable medium of claim 1, wherein the changes that occurred in the one or more databases as a result of the execution of the software test include changes to a value in the one or more databases.

9. The non-transitory computer readable medium of claim 8, wherein displaying the changes that occurred in the one or more databases includes displaying the value that was logged during the software test.

10. The non-transitory computer readable medium of claim 1, wherein the at least one user interface displays the changes in an organized graphic user interface screen for the user to evaluate the changes.

11. The non-transitory computer readable medium of claim 1, wherein the at least one user interface presents the user with an option to indicate whether the software test passed or failed.

12. The non-transitory computer readable medium of claim 11, wherein if the user indicates that the software test failed, the at least one user interface prompts the user for an indication of a specific failure to incite saving information associated with the specific failure.

13. The non-transitory computer readable medium of claim 1, wherein the at least one user interface displays controllers that allow the user to select specific information to ignore testing in future software tests.

14. The non-transitory computer readable medium of claim 1, wherein the changes that occurred in the one or more databases as a result of the execution of the software test are logged for future software tests.

15. The non-transitory computer readable medium of claim 1, wherein identifying the difference in the changes that occurred in the one or more databases as a result of the execution of the software test and the past changes that occurred in the one or more databases as a result of a prior execution of the software test functions to validate the one or more databases as at least part of validating the software test.

16. A method, comprising:
    receiving an indication that a user has requested execution of a software test that utilizes one or more databases;
    in response to receiving the indication that the user has requested execution of the software test and prior to the execution of the software test, recording a first configuration snapshot of the one or more databases, the first configuration snapshot including:
    an initial state of a configuration of the one or more databases including initial structures stored in the one or more databases and initial names of tables and fields included in the one or more databases, and initial information stored in the one or more databases;
receiving an indication that the execution of the software test has finished;
recording a second configuration snapshot of the one or more databases in response to receiving the indication that the execution of the software test has finished, the second configuration snapshot including:
    an end state of a configuration of the one or more databases including end structures stored in the one or more databases and end names of the tables and the fields included in the one or more databases, and end information stored in the one or more databases;
automatically comparing the first configuration snapshot of the one or more databases to the second configuration snapshot of the one or more databases to identify differences between the first configuration snapshot and the second configuration snapshot;
automatically identifying changes that occurred in the one or more databases as a result of the execution of the software test, based on the differences identified from comparing of the first configuration snapshot of the one or more databases to the second configuration snapshot of the one or more databases;
displaying the changes that occurred in the one or more databases as a result of the execution of the software test utilizing at least one user interface;
automatically comparing the changes that occurred in the one or more databases as a result of the execution of the software test to past changes that occurred in the one or more databases as a result of a prior execution of the software test;
automatically identifying a difference in the changes that occurred in the one or more databases as a result of the execution of the software test and the past changes that occurred in the one or more databases as a result of a prior execution of the software test, based on comparing the changes that occurred in the one or more databases as a result of the execution of the software test and the past changes that occurred in the one or more databases as a result of a prior execution of the software test; and
displaying an indication of the difference in the changes that occurred in the one or more databases as a result of the execution of the software test and the past changes that occurred in the one or more databases as a result of a prior execution of the software test, utilizing the at least one user interface.

17. A system, comprising:
one or more hardware processors for:
receiving an indication that a user has requested execution of a software test that utilizes one or more databases;
in response to receiving the indication that the user has requested execution of the software test and prior to the execution of the software test, recording a first configuration snapshot of the one or more databases, the first configuration snapshot including:
    an initial state of a configuration of the one or more databases including initial structures stored in the one or more databases and initial names of tables and fields included in the one or more databases, and initial information stored in the one or more databases;
receiving an indication that the execution of the software test has finished;
recording a second configuration snapshot of the one or more databases in response to receiving the indication that the execution of the software test has finished, the second configuration snapshot including:
    an end state of a configuration of the one or more databases including end structures stored in the one or more databases and end names of the tables and the fields included in the one or more databases, and end information stored in the one or more databases;
automatically comparing the first configuration snapshot of the one or more databases to the second configuration snapshot of the one or more databases to identify differences between the first configuration snapshot and the second configuration snapshot;
automatically identifying changes that occurred in the one or more databases as a result of the execution of the software test, based on the differences identified from comparing of the first configuration snapshot of the one or more databases to the second configuration snapshot of the one or more databases;
displaying the changes that occurred in the one or more databases as a result of the execution of the software test utilizing at least one user interface;
automatically comparing the changes that occurred in the one or more databases as a result of the execution of the software test to past changes that occurred in the one or more databases as a result of a prior execution of the software test;
automatically identifying a difference in the changes that occurred in the one or more databases as a result of the execution of the software test and the past changes that occurred in the one or more databases as a result of a prior execution of the software test, based on comparing the changes that occurred in the one or more databases as a result of the execution of the software test and the past changes that occurred in the one or more databases as a result of a prior execution of the software test; and
displaying an indication of the difference in the changes that occurred in the one or more databases as a result of the execution of the software test and the past changes that occurred in the one or more databases as a result of a prior execution of the software test, utilizing the at least one user interface.

18. The non-transitory computer readable medium of claim 1, further comprising validating the one or more databases as at least part of validating the software test, based on the difference in the changes that occurred in the one or more databases as a result of the execution of the software test and the past changes that occurred in the one or more databases as a result of a prior execution of the software test.

* * * * *